United States Patent
Kitada

(10) Patent No.: US 9,928,395 B2
(45) Date of Patent: Mar. 27, 2018

(54) OPTICAL SYMBOL READING APPARATUS AND READING METHOD

(71) Applicant: Roland DG Corporation, Hamamatsu-shi, Shizuoka (JP)

(72) Inventor: Tokio Kitada, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 0 days.

(21) Appl. No.: 15/501,509

(22) PCT Filed: Jul. 9, 2015

(86) PCT No.: PCT/JP2015/069808
§ 371 (c)(1),
(2) Date: Feb. 3, 2017

(87) PCT Pub. No.: WO2016/021366
PCT Pub. Date: Feb. 11, 2016

(65) Prior Publication Data
US 2017/0235988 A1    Aug. 17, 2017

(30) Foreign Application Priority Data

Aug. 6, 2014   (JP) .................................. 2014-159985

(51) Int. Cl.
*G06K 7/14* (2006.01)
*G06K 7/12* (2006.01)

(52) U.S. Cl.
CPC ............. *G06K 7/1417* (2013.01); *G06K 7/12* (2013.01)

(58) Field of Classification Search
CPC ............ G06K 7/10851; G06K 7/10722; G06K 7/10881; G06K 7/10732; G06K 7/10584
(Continued)

(56) References Cited

U.S. PATENT DOCUMENTS

2003/0025815 A1   2/2003  Hashimoto
2008/0017717 A1*  1/2008  Miyazaki ........... G06K 7/10574
                                                  235/472.01
(Continued)

FOREIGN PATENT DOCUMENTS

JP       10-334176 A      12/1998
JP       2003-032453 A     1/2003
(Continued)

OTHER PUBLICATIONS

Official Communication issued in International Patent Application No. PCT/JP2015/069808, dated Aug. 4, 2015.

*Primary Examiner* — Daniel Hess
(74) *Attorney, Agent, or Firm* — Keating & Bennett, LLP

(57) ABSTRACT

A reading apparatus includes an illuminator illuminating an optical symbol with blue light, an imager taking an image of the optical symbol illuminated with the blue light, and a controller including a receiving circuit receiving the image taken by the imager, a determination circuit determining whether or not the received image has a resolution equal to or higher than a predetermined reading resolution, an image acquisition circuit acquiring the received image as image data if the determination circuit determines that the received image has a resolution equal to or higher than the reading resolution, and a light adjusting circuit changing an illumination condition of the blue light if the determination circuit determines that the received image has a resolution less than the reading resolution.

12 Claims, 5 Drawing Sheets

(58) Field of Classification Search
USPC .................................. 235/462.01–462.49
See application file for complete search history.

(56) References Cited

U.S. PATENT DOCUMENTS

| | | |
|---|---|---|
| 2009/0108074 A1 | 4/2009 | Vinogradov |
| 2012/0168509 A1 | 7/2012 | Nunnink et al. |
| 2013/0161399 A1 | 6/2013 | He et al. |

FOREIGN PATENT DOCUMENTS

| | | |
|---|---|---|
| JP | 2006-277315 A | 10/2006 |
| JP | 2007-188304 A | 7/2007 |
| JP | 2008-047091 A | 2/2008 |
| JP | 2008-310631 A | 12/2008 |
| JP | 2011-043977 A | 3/2011 |
| JP | 2013-080515 A | 5/2013 |
| WO | 2006/068848 A1 | 6/2006 |

* cited by examiner

□ : 18(OFF)   ■ : 18(ON)

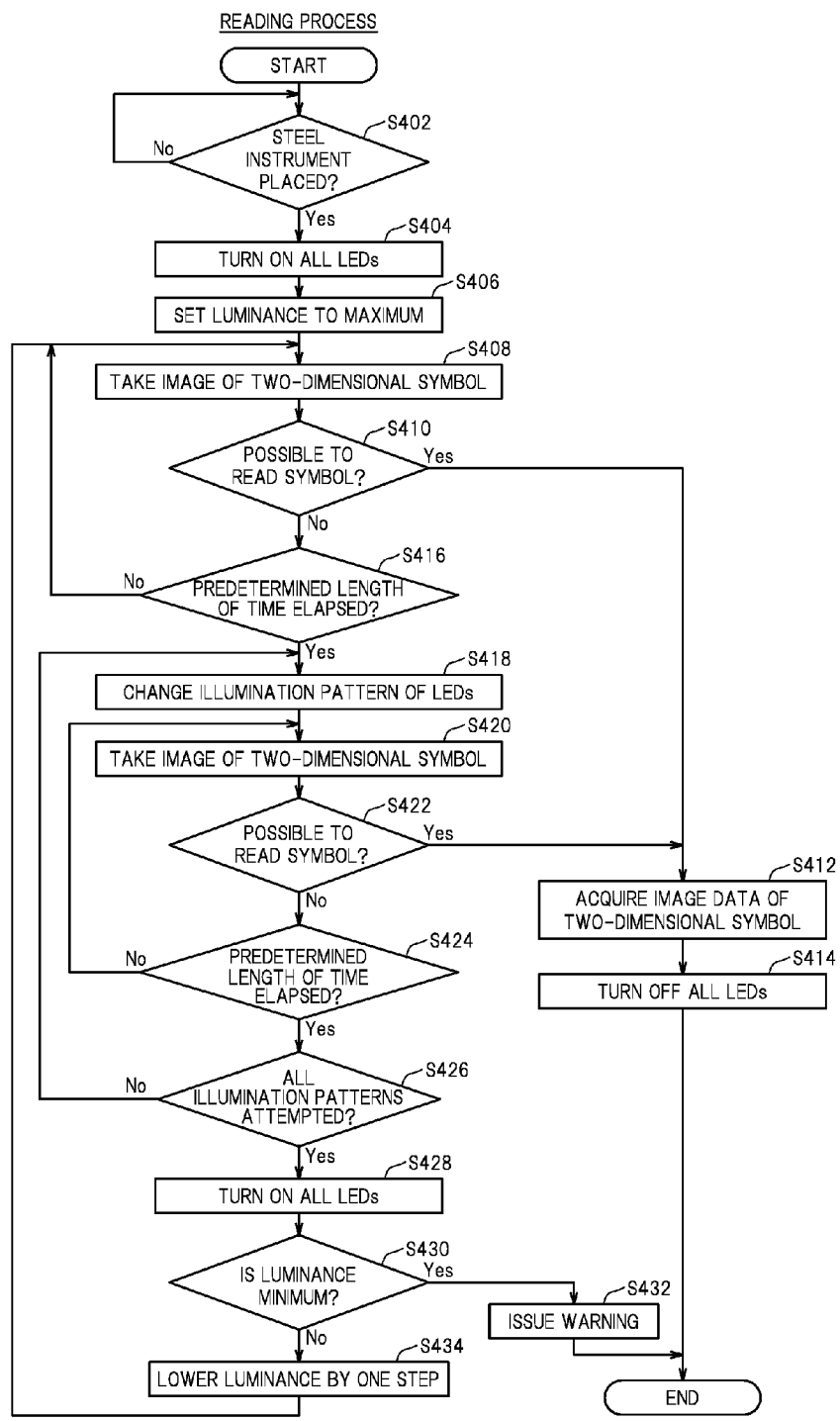

OPTICAL SYMBOL READING APPARATUS AND READING METHOD

CROSS REFERENCE TO RELATED APPLICATIONS

This application claims the benefit of priority to Japanese Patent Application No. 2014-159985 filed on Aug. 6, 2014, the entire contents of which are hereby incorporated herein by reference.

BACKGROUND OF THE INVENTION

1. Field of the Invention

The present invention relates to an optical symbol reading apparatus and a reading method.

2. Description of the Related Art

In recent years, steel instruments for medical purposes are often marked with optical symbols for such purposes as article management. The steel instruments for medical purposes are washed and sterilized frequently. For that reason, the optical symbols are directly formed (i.e., directly marked, or formed by direct part marking) typically on the surfaces of the steel instruments by such techniques as stamping and etching.

The term "optical symbol" is a generic term for an information medium that stores information by combinations of high optical reflectivity portions and low optical reflectivity portions. One example is a two-dimensional symbol (also referred to as a two-dimensional code or a two-dimensional barcode) in which information units referred to as cells are lined up vertically and horizontally. Specific examples include a QR code (tradename), a data matrix, and a data tag. The information of the two-dimensional symbols is read by a reading apparatus. The reading apparatus acquires image data of a two-dimensional symbol by illuminating the surface marked with the two-dimensional symbol with an illumination, such as a red LED (light emitting diode), and receiving the reflected light therefrom. The reading apparatus analyzes the image data and obtains the information recorded in the two-dimensional symbol.

However, in the case that the two-dimensional symbol is directly marked on the surface of a steel instrument, it may be more difficult to read the information than, for example, in the case that the two-dimensional symbol is printed on a label that is affixed to a steel instrument. For example, when the two-dimensional symbol is formed on a curved surface of the steel instrument, the illuminating light may undergo diffused reflection so that the reading apparatus cannot receive the reflected light. Alternatively, the illumination light may reflect on the surface of the steel instrument, causing halation, so that the acquired image data become completely white. Furthermore, accuracy variations in the direct part marking and deterioration resulting from long-term use may cause variations in the two-dimensional symbols. As a consequence, the reading apparatus may not be able to read the information of the two-dimensional symbols satisfactorily.

The technique disclosed in JP 2013-080515 A is known as a technique that solves this problem. JP 2013-080515 A discloses a two-dimensional symbol reading apparatus provided with a high-angle bright field illumination (for example, a red LED) and a low-angle dark field illumination (for example, a blue LED). The reading apparatus of JP 2013-080515 A adjusts illumination by combining two types of light sources having different angles of incidence, to read two-dimensional symbols formed on surfaces of objects with various shapes.

The apparatus disclosed in JP 2013-080515 A requires adjustment of the illuminations, for example, each time the type or surface shape of the steel instrument marked with a two-dimensional symbol changes. However, in a surgical operation, for example, a large number of steel instruments are used at one time. Also, a variety of steel instruments are used. This means that the user needs to carry out troublesome adjusting work of the illuminations repeatedly, resulting in low work efficiency and placing a heavy burden on the user.

SUMMARY OF THE INVENTION

Preferred embodiments of the present invention provide a reading apparatus and a reading method that make it possible to read an optical symbol with a simple operation.

A reading apparatus according to a preferred embodiment of the present invention includes: an illuminator illuminating an optical symbol marked on an object with blue light; an imager taking an image of the optical symbol illuminated with the blue light; and a controller connected to the illuminator and the imager. The controller includes a receiving circuit receiving the image taken by the imager, a determination circuit determining whether the received image has a resolution equal to or higher than a predetermined reading resolution, an image acquisition circuit acquiring the image as image data if the determination circuit determines that the received image has a resolution equal to or higher than the reading resolution, and a light adjusting circuit changing an illumination condition of the blue light if the determination circuit determines that the received image has a resolution less than the reading resolution.

A reading method according to a preferred embodiment of the present invention includes: a first step of illuminating an optical symbol marked on an object with blue light by an illuminator and taking an image of the optical symbol by an imager; a second step of determining whether or not the image taken in the first step has a resolution equal to or higher than a predetermined reading resolution; and a third step of acquiring the image as image data if it is determined in the second step that the taken image has a resolution equal to or higher than the reading resolution, and changing an illumination condition of the blue light if it is determined in the second step that the taken image has a resolution less than the reading resolution.

The reading apparatus and the reading method according to various preferred embodiments of the present invention make it possible to read optical symbols easily. In addition, the reading apparatus and the reading method according to various preferred embodiments of the present invention significantly reduce the burden on the user that is associated with the work of adjusting illuminations.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a flow-chart illustrating a reading method according to a preferred embodiment of the present invention.

DETAILED DESCRIPTION OF THE PREFERRED EMBODIMENTS

Hereinbelow, preferred embodiments of the present invention will be described in detail with reference to the drawings. The preferred embodiments described herein are not intended to limit the present invention. The elements and components that exhibit the same effects are denoted by the same reference symbols, and repetitive description thereof may be omitted.

Figure 1A:
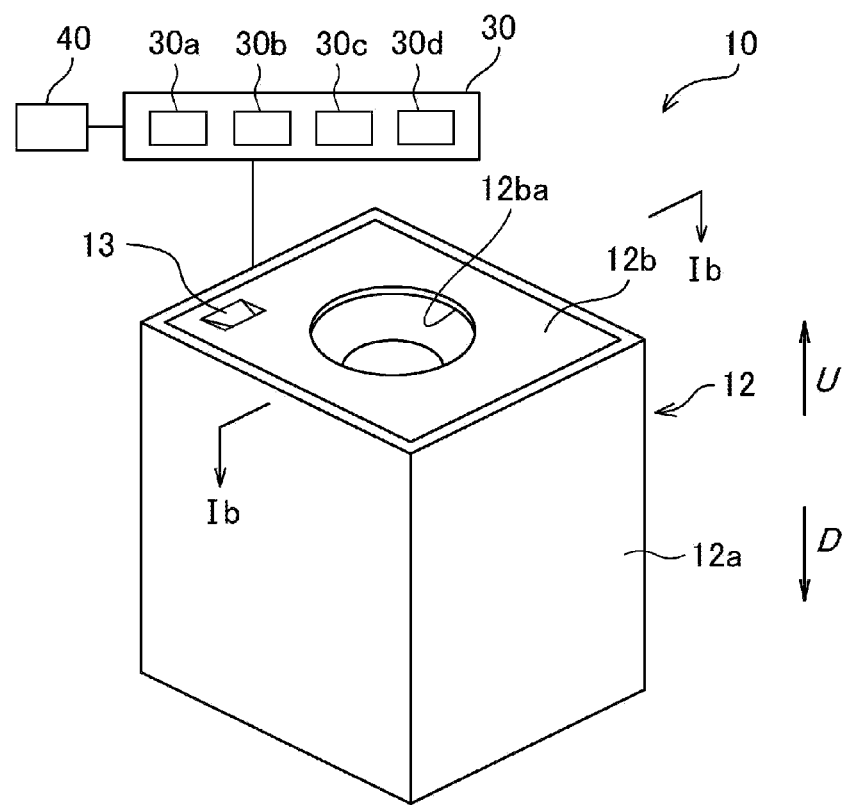
FIG. 1A is a perspective view of a reading apparatus according to a preferred embodiment of the present invention.
Figure 1B:
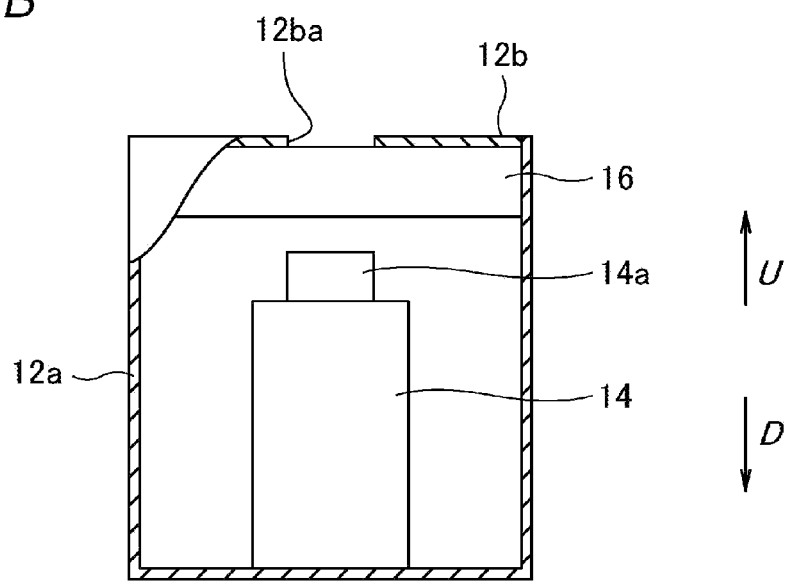
FIG. 1B is a cross-sectional view taken along line Ib-Ib in FIG. 1A.

The following describes, as an example, a case in which a two-dimensional symbol 22 (see FIG. 5A) formed on a surface of a steel instrument 20 is read. FIG. 1A is a perspective view of a reading apparatus 10 according to a preferred embodiment of the present invention. FIG. 1B is a cross-sectional view taken along line Ib-Ib in FIG. 1A. In FIG. 1 and so forth, reference characters U and D respectively indicate upward and downward along the gravitational direction.

The reading apparatus 10 reads the two-dimensional symbol 22 formed on a surface of the steel instrument 20. The reading apparatus 10 includes a housing 12, an imager 14, an illuminator 16, and a microcomputer 30 defining a controller. The imager 14 and the illuminator 16 are connected to the microcomputer 30.

In the present preferred embodiment, the housing 12 includes a main body 12a preferably with an angular U-shaped cross section and an opening in its upper surface, and a lid 12b that covers the angular U-shaped portion of the main body 12a. A circular or substantially circular opening 12ba is located in a central or substantially central portion of the lid 12b. The steel instrument 20 is placed on the lid 12b. That is, the lid 12b is a support table on which the steel instrument 20 is placed. The support table is an example of a support that supports the steel instrument 20. However, the support is not limited to such a member that supports the steel instrument 20 from below. The support is not limited to any particular form. The lid 12b is provided with a sensor 13 that detects whether or not the steel instrument 20 is placed thereon. This makes it possible to easily identify whether or not the steel instrument 20 is present before taking an image of the two-dimensional symbol 22. This prevents wasteful power consumption that results from unnecessary starting of the illuminator 16 or the imager 14.

The steel instrument 20 is disposed on the opening 12ba so that its surface marked with the two-dimensional symbol 22 faces downward along the gravitational direction. The imager 14 is disposed in the housing 12 and below the lid 12b, in which the opening 12ba is provided. The illuminator 16 is disposed between the lid 12b and the imager 14 in the housing 12. Such an arrangement makes it possible to read the two-dimensional symbol 22 by merely placing the steel instrument 20 on the lid 12b. In other words, the work of placing the object is able to be carried out easily. Moreover, because the illuminator 16 is at a position closer to the steel instrument 20 than is the imager 14, the two-dimensional symbol 22 is able to be illuminated easily. This prevents a shadow from being cast on the taken image and to obtain an image with a high resolution.

The imager 14 includes a lens 14a that takes an image. The imager 14 is capable of taking an image of a predetermined region in the opening 12ba. Note that the predetermined region here means a region in which an image of the two-dimensional symbol 22 is able to be appropriately taken. The image (for example, moving image) taken by the imager 14 is sent to a receiving circuit 30a of the microcomputer 30.

Figure 2:
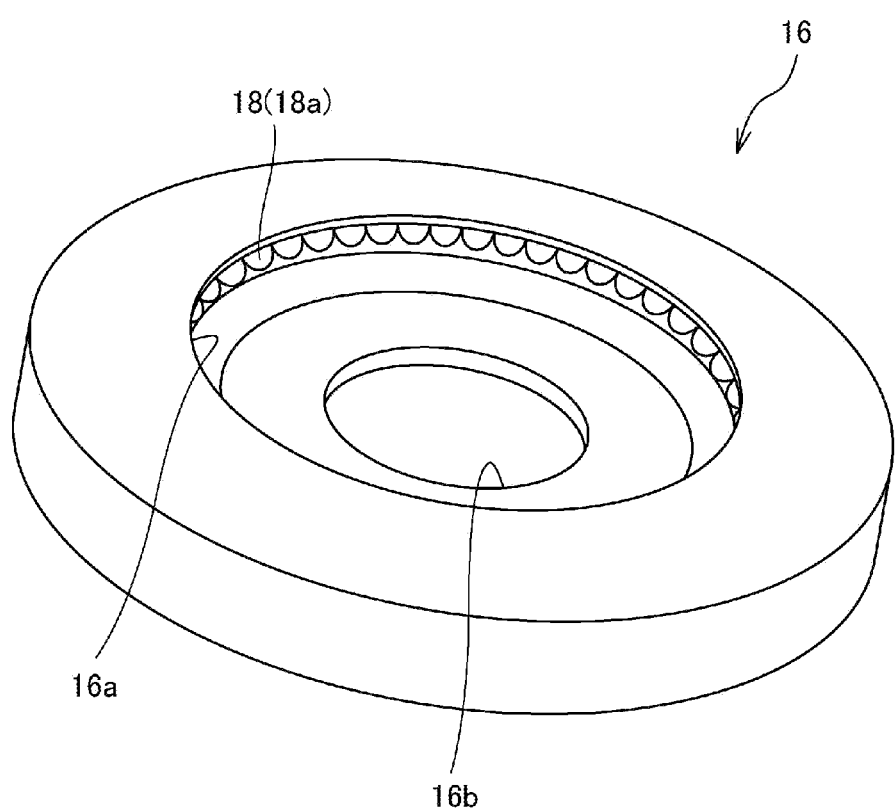
FIG. 2 is a perspective view illustrating the configuration of an illuminator.

The illuminator 16 illuminates the two-dimensional symbol 22 with blue light. FIG. 2 is a perspective view illustrating the configuration of the illuminator 16. In the present preferred embodiment, the illuminator 16 has a ring-shaped (i.e., doughnut-shaped) contour. In other words, the illuminator 16 preferably has a cylindrical or substantially cylindrical shape with openings 16a and 16b provided at its central portion. A plurality of LEDs 18 defining and functioning as light sources are disposed on an inner circumferential surface of the illuminator 16. The LEDs 18 emit blue light. Because the LEDs 18 emit blue light, it is possible to capture the contrast of the two-dimensional symbol 22 accurately even when the reflectivity of the object marked with the two-dimensional symbol 22 is high, for example. For example, even when the surface of the steel instrument 20 is plated with black plating, the two-dimensional symbol 22 is able to be read appropriately. The plurality of LEDs 18 are arranged in one row and in a ring shape so as to surround the two-dimensional symbol 22. That is, the illuminator 16 includes a ring-shaped blue light emitting portion (hereinafter referred to as "blue light illumination section") 18a. The inner diameter of the blue light illumination section 18a is larger than the inner diameter of the opening 12ba of the lid 12b. In the present preferred embodiment, the plurality of LEDs 18 are arranged at different positions from each other relative to the two-dimensional symbol 22. This enables the two-dimensional symbol 22 to be illuminated with light from a variety of angles. As a result, the areas in which "shadows" are formed are able to be eliminated in a more desirable manner, so that a clear and high-resolution image is obtained.

An upper opening portion 16a of the illuminator 16 is in communication with the lid 12b. The lens 14a of the imager 14 is positioned below a lower opening portion of the illuminator 16. FIG. 5B is a partially exploded view of the reading apparatus shown in FIG. 1B. As seen, the lid 12b, the illuminator 16, and the imager 14 are disposed so that the center position O1 of the opening 12ba of the lid 12b, the center position O2 of the blue light illumination section 18a of the illuminator 16, and the center position O3 of the lens 14a of the imager 14 are positioned coaxially with each other. Thus, the two-dimensional symbol 22, the center position O2 of the blue light illumination section 18, and the lens 14a are positioned coaxially with each other. As a result, the two-dimensional symbol 22 is illuminated appropriately with the blue light from the illuminator 16. With the two-dimensional symbol 22 being illuminated, the imager 14 is able to acquire an image with a high resolution.

The illuminator 16 is controlled by a light adjusting circuit 30d of the microcomputer 30. The light adjusting circuit 30d adjusts the illuminator 16 so that the contrast of the two-dimensional symbol 22 becomes desirable. The light adjusting circuit 30d adjusts, for example, the luminance of the blue light emitted from the LEDs 18. Specifically, the light adjusting circuit 30d increases or lowers the luminance of the blue light step by step. Alternatively, the light adjusting circuit 30d changes a illumination pattern of the blue light. The illumination pattern includes a combination of lit (ON) and unlit (OFF) states of the plurality of LEDs 18. By changing the illumination pattern, the illumination angle of the blue light to the two-dimensional symbol 22 is changed. As a result, the illumination is able to be adjusted to be suitable for image taking, and a clear image of the two-dimensional symbol 22 is able to be obtained.

Figure 3A:
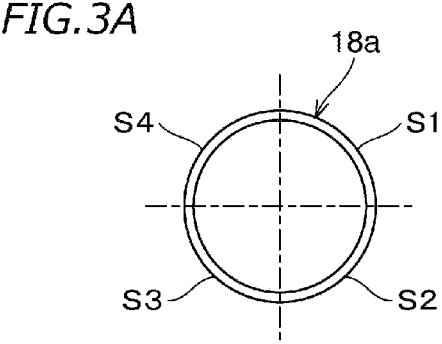
FIG. 3A illustrates an example in which the blue light illumination section of the illuminator is divided into four regions.
Figure 3B:
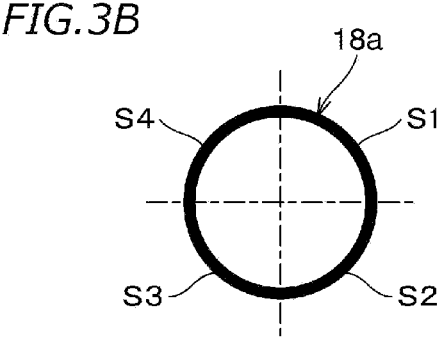
FIGS. 3B to 3F illustrate examples of illumination patterns under this condition.
Figure 3C:
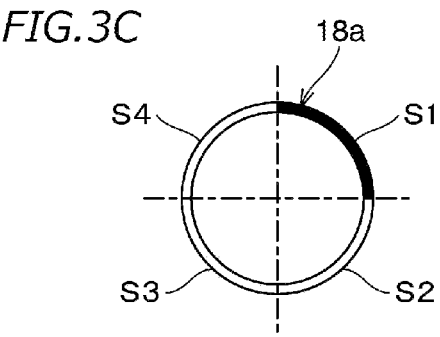
Figure 3D:
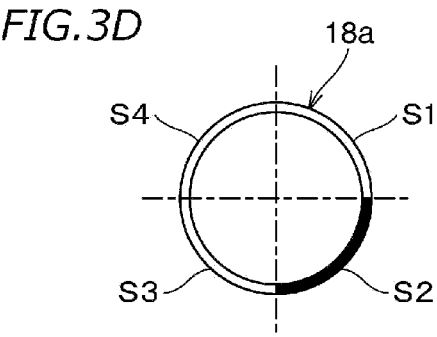
Figure 3E:
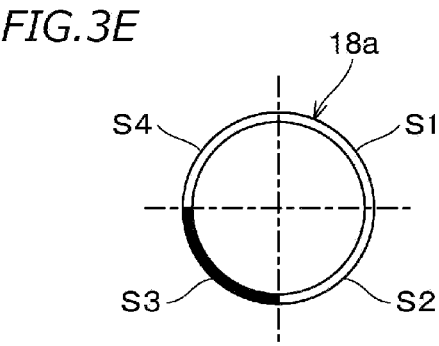

FIG. 3A illustrates an example in which the blue light illumination section 18a of the illuminator 16 is divided into a plurality of regions. In the present preferred embodiment, the blue light illumination section 18a preferably is divided into four regions (a first region S1, a second region S2, a third region S3, and a fourth region S4), for example. The illumination patterns of the respective regions are determined in advance. The light adjusting circuit 30d of the microcomputer 30 carries out illumination of blue light based on the predetermined illumination patterns.

Figure 3F:
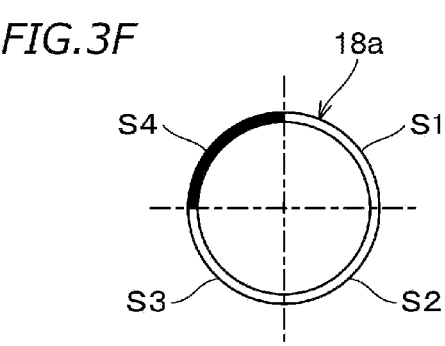

FIGS. 3B to 3F each illustrates an example of the illumination patterns. In the present preferred embodiment, examples include a pattern in which all the regions are lit (FIG. 3B), a pattern in which only the region S1 is lit (FIG. 3C), a pattern in which only the region S2 is lit (FIG. 3D), a pattern in which only the region S3 is lit (FIG. 3E), and a pattern in which only the region S4 is lit (FIG. 3F). The illumination patterns, however, are not limited to the patterns illustrated in FIGS. 3A to 3F. For example, it is possible to use a pattern in which two of the regions are lit, or it is also possible to use a pattern in which three of the regions are lit. Furthermore, it is also possible to combine any of these patterns as desired. A wide variety of illumination patterns may be created by dividing the blue light illumination section 18a into a plurality of regions. This enables the reading apparatus to flexibly handle two-dimensional symbols 22 that are formed on various types of objects or on surfaces with various kinds of shapes.

The microcomputer 30 includes the receiving circuit 30a, a determination circuit 30b, an image acquisition circuit 30c, and the light adjusting circuit 30d. The receiving circuit 30a receives an image taken by the imager 14. The determination circuit 30b determines, from the received image, whether or not the two-dimensional symbol 22 is clear. In other words, the determination circuit 30b determines whether or not the two-dimensional symbol 22 appears in the image. Furthermore, if the two-dimensional symbol 22 appears in the image, the determination circuit 30b determines whether or not the image of the two-dimensional symbol 22 has a resolution equal to or higher than a predetermined reading resolution.

The image acquisition circuit 30c acquires the image of the two-dimensional symbol 22 as image data (still image) if the determination circuit 30b determines that the image of the two-dimensional symbol 22 has a resolution equal to or higher than a predetermined reading resolution (i.e., that the image of the two-dimensional symbol 22 is clear). In other words, the image acquisition circuit 30c does not acquire the image data of the two-dimensional symbol 22 if it is determined that the image of the two-dimensional symbol 22 has a resolution less than the reading resolution. In the present preferred embodiment, the acquired image data are output from the microcomputer 30 to a personal computer 40.

The light adjusting circuit 30d changes an illumination condition of the blue light of the illuminator 16 if the determination circuit 30b determines that the image of the two-dimensional symbol 22 has a resolution less than the reading resolution (i.e., that the image of the two-dimensional symbol 22 is unclear). In a first mode, the light adjusting circuit 30d changes the luminance of the blue light. For example, the light adjusting circuit 30d lowers the luminance of the blue light. Alternatively, the light adjusting circuit 30d increases the luminance of the blue light. The luminance of the blue light may be changed step by step. In a second mode, the light adjusting circuit 30d changes the illumination pattern of the illuminator 16. Thus, the light adjusting circuit 30d automatically adjusts an illumination condition of the blue light so that the image taking of the two-dimensional symbol 22 is able to be performed appropriately. It is therefore possible to achieve appropriate illumination depending on the type or surface shape of the object marked with the two-dimensional symbol 22. In addition, the region in which the image of the two-dimensional symbol 22 is acquired appropriately is able to be set wider (i.e., the previously-described predetermined region in the opening 12ba is able to be made wider).

The personal computer 40 obtains the information stored in the two-dimensional symbol 22 from the image data acquired by the image acquisition circuit 30c of the microcomputer 30. In one example, the user of steel instruments 20 is able to carry out management of the steel instruments 20 based on the obtained information. For example, it is possible to accurately obtain the data of each of the steel instruments 20, such as the number of times the steel instrument 20 is used, the service life thereof, and the deterioration of quality thereof, as the individual information of each steel instrument 20. Moreover, the user is able to easily distinguish between used steel instruments 20 and unused steel instruments 20. It is also possible to carry out ordering of broken steel instruments 20 efficiently. Thus, management of the steel instruments 20 is able to be carried out very easily and reliably. Although the microcomputer 30 and the personal computer 40 are separate from each other herein, it is also possible that they may be integrated with each other.

Figure 5A:
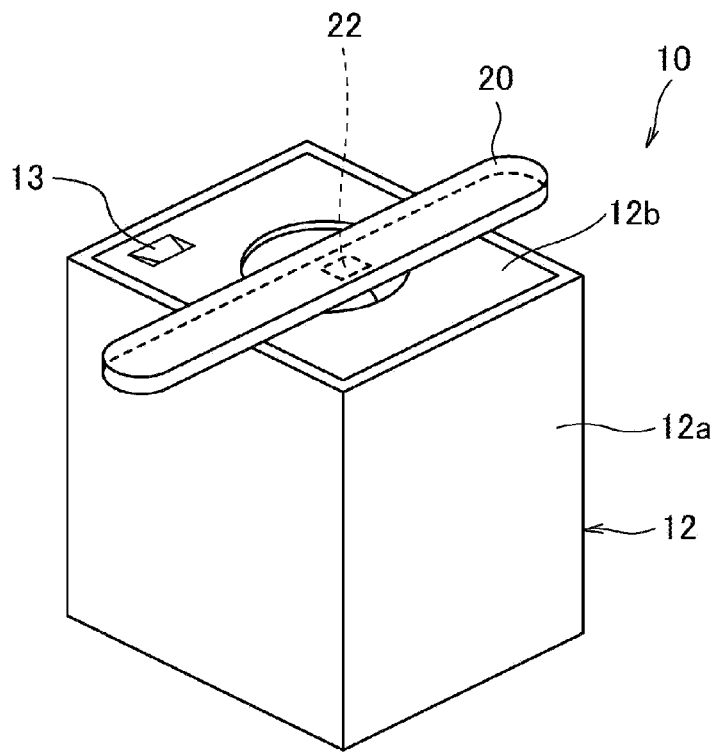
FIG. 5A is an illustrative view showing a reading apparatus on which an object is placed.
Figure 5B:
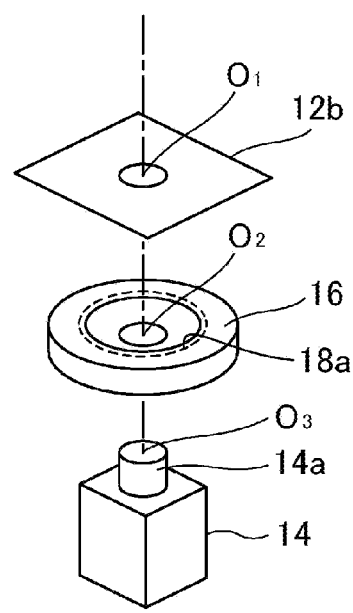
FIG. 5B is a partially exploded view of the reading apparatus shown in FIG. 1B.

When reading the two-dimensional symbol 22 formed on a steel instrument 20, the steel instrument 20 is, initially, placed on the lid 12b of the reading apparatus 10, as illustrated in FIG. 5A. The steel instrument 20 is placed so that the two-dimensional symbol 22 is positioned within the predetermined region in the opening 12ba in the lid 12b. Next, an operating switch (not shown) is operated to instruct the reading apparatus 10 to start reading the two-dimensional symbol 22. When starting of the reading is instructed, the imager 14 and the illuminator 16 are started by the microcomputer 30.

The flow-chart of FIG. 4 illustrates a reading method of a two-dimensional symbol 22 according to a preferred embodiment of the present invention. In this preferred embodiment, first, it is determined whether or not a steel instrument 20 has been placed on the reading apparatus 10 (step S402). For example, it is determined whether or not the steel instrument 20 has been placed on the lid 12b (i.e., the support table) using the sensor 13 provided on the lid 12b. More specifically, using the sensor 13, it is determined whether or not the steel instrument 20 is positioned within the predetermined region in the opening 12ba.

If it is determined in the foregoing determination that the steel instrument 20 is not placed on the reading apparatus 10 (S402: NO), the process returns again to step S402. That is, step S402 is repeated until it is determined that the steel instrument 20 has been placed on the reading apparatus 10. On the other hand, if it is determined in the foregoing determination that the steel instrument 20 has been placed on the reading apparatus 10 (S402: YES), all the plurality of LEDs 18 of the illuminator 16 are lit (step S404). As a result, the two-dimensional symbol 22 of the steel instrument 20 are illuminated with blue light emitted from the LEDs 18 of the illuminator 16.

Next, the luminance of the blue light emitted from the LEDs 18 is adjusted to a predetermined maximum luminance value (step S406). The maximum luminance value may be set to the maximum luminance that the LEDs 18 are capable of emitting, or it may be set to any luminance value.

Next, the imager 14 takes an image of a predetermined region in the opening 12ba. Thus, an image (for example, moving image) of the two-dimensional symbol 22 illuminated with the blue light is acquired. The acquired image is sent to the receiving circuit 30a of the controller 30. The determination circuit 30b of the controller 30 determines, from the received image, whether or not the two-dimensional symbol 22 has a resolution equal to or higher than a predetermined reading resolution. The reading resolution may be set to any desired resolution, taking into consideration the performance of the imager 14, the performance of the image processing software, and the like. The reading resolution may be set, for example, based on whether the contrast of the image is clear enough to read out the information stored in the two-dimensional symbol 22. In other words, the determination circuit 30b determines whether or not the reading apparatus 10 has been able to read the two-dimensional symbol 22 (step S410).

If it is determined in the foregoing determination that it has been possible to read the two-dimensional symbol 22 (S410: YES), the image acquisition circuit 30c of the controller 30 acquires the image of the two-dimensional symbol 22 as image data (still image) (step S412). The image data are output to the personal computer 40 connected to the reading apparatus 10. Then, the LEDs 18 of the illuminator 16 are turned off (step S414), and reading of the two-dimensional symbol 22 is terminated.

On the other hand, if it is determined in the foregoing determination that it has been impossible to read the two-dimensional symbol 22 (S410: NO), it is determined whether or not a predetermined length of time has elapsed. For example, it is determined whether or not a predetermined length of time (e.g., 2 seconds), which has been set in advance, has elapsed. If it is determined in the foregoing determination that the predetermined length of time has not yet elapsed (S416: NO), the process returns to step S408, and an image of the two-dimensional symbol 22 is taken again. On the other hand, if it is determined in the foregoing determination that the predetermined length of time has elapsed (S416: YES), the illumination pattern of the LEDs 18 is changed (step S418).

The illumination pattern may be changed in the following manner, for example. If the two-dimensional symbol 22 cannot be read under the condition of FIG. 3B, in which all the regions are lit, the illumination pattern is changed to the pattern shown in FIG. 3C, in which only the first region is lit. If the two-dimensional symbol 22 cannot be read under the condition of FIG. 3C, the illumination pattern is changed to the pattern shown in FIG. 3D, in which only the second region is lit. If the two-dimensional symbol 22 cannot be read under the condition of FIG. 3D, the illumination pattern is changed to the pattern shown in FIG. 3E, in which only the third region is lit. If the two-dimensional symbol 22 cannot be read under the condition of FIG. 3E, the illumination pattern is changed to the pattern shown in FIG. 3F, in which only the fourth region is lit.

After the illumination pattern of the LEDs 18 is changed, similar steps to the foregoing steps S408, S410, and S416 are performed, in which an image of the two-dimensional symbol 22 is taken (step S420), it is determined whether or not it has been possible to read the two-dimensional symbol 22 (step S422), and it is determined whether or not a predetermined length of time has elapsed (S424), respectively. At step S424, for example, it is determined whether or not a predetermined length of time (e.g., 5 seconds), which has been set in advance, has elapsed.

If it is determined in the foregoing determination that the predetermined length of time has not yet elapsed (S424: NO), the process returns to step S420, and an image of the two-dimensional symbol 22 is taken again. On the other hand, if it is determined in the foregoing determination that the predetermined length of time has elapsed (S424: YES), it is determined whether or not all the plurality of preset illumination patterns have been attempted (step S426). For example, in the case that the illumination pattern is set to change in the order of FIG. 3B through 3F, it is determined whether or not the illumination pattern of FIG. 3F, in which only the fourth region is lit, has been attempted.

If it is determined in the foregoing determination that not all the illumination patterns have been attempted (S426: NO), the process returns to step S418, in which the illumination pattern of the LEDs 18 is changed again. If it is determined in the foregoing determination that all the illumination patterns have been attempted (S426: YES), all the LEDs 18 are lit (step S428).

Next, it is determined whether or not the luminance of the LEDs 18 is at a predetermined minimum luminance value (step S430). The minimum luminance value may be set to the minimum luminance that the LEDs 18 are capable of emitting, or it may be set to any luminance value.

If it is determined in the foregoing determination that the luminance of the blue light is at the minimum luminance value (S430: YES), a warning is issued that it was impossible to read the two-dimensional symbol 22 (step S432). The warning may be issued by, for example, blinking a light (not shown), such as an LED, that is provided on the outer surface of the main body 12a, or by emitting predetermined sound from a speaker (not shown) provided in the housing 12. This allows the user to be notified that it was impossible to read the two-dimensional symbol 22. Then, reading of the two-dimensional symbol 22 is terminated. On the other hand, if it is determined in the foregoing determination that the luminance of the blue light is not at the minimum luminance value (S430: NO), the luminance is lowered by one step (step S434). Then, the process returns to step S408, and the subsequent steps are performed successively.

In the reading apparatus and the reading method according to preferred embodiments of the present invention, after an object is placed on the support table, adjustment of the illumination is automatically performed and the optical symbol is read, as described above. Therefore, it is possible to read optical symbols that are formed on the surfaces of various types of objects or on surfaces with various kinds of shapes appropriately. For example, even when a two-dimensional symbol is present on a curved surface on an object, it is possible to read the optical symbol easily and quickly. Moreover, it is unnecessary for the user to adjust the illumination depending on the type or surface shape of the object marked with the two-dimensional symbol. Therefore, the burden on the user is lessened, and the apparatus is easy to use.

Hereinabove, preferred embodiments of the present invention have been described. It should be noted, however, that the foregoing preferred embodiments are merely exemplary, and the present invention may of course be embodied in various other forms. For example, it is possible to use modified examples as shown in the following examples (1) through (6). In addition, the foregoing preferred embodiments and the following modified examples (1) through (6) may be combined as appropriate.

(1) In the foregoing preferred embodiments, the reading apparatus 10 is configured to read two-dimensional symbols 22. However, this is merely an illustrative example. For example, the reading apparatus may be configured to read one-dimensional symbols, such as barcodes.

(2) In the foregoing preferred embodiments, the two-dimensional symbol 22 directly marked on the surface of the steel instrument 20 is read. However, this is merely an illustrative example. For example, it is also possible to read a two-dimensional symbol label affixed to the surface of the steel instrument. Moreover, the object that is marked with the two-dimensional symbol 22 is not limited to the steel instrument 20. It is possible to use, as the object, various objects made of a variety of materials, such as metal, glass, and resin.

(3) In the foregoing preferred embodiments, the LEDs 18 are arranged in the illuminator 16. However, this is merely an illustrative example. For example, it is also possible to use various types of blue light illuminations that are able to adjust the luminance. In addition, the illuminator 16 is equipped with the ring-shaped blue light illumination section 18a in the foregoing preferred embodiments. However, this is also merely an illustrative example. The blue light illumination section 18a may be in other shapes, such as linear shapes, wave shapes, or polygonal annular shapes. Furthermore, only blue light illumination is used in the foregoing preferred embodiments. However, it is also possible to use, in combination, white light illumination, red light illumination, or the like. In the foregoing preferred embodiments, the blue light illumination section 18a of the illuminator 16 is divided into four regions, but this is merely an illustrative example. It is possible that, for example, the blue light illumination section 18a may be divided into two regions, three regions, or five regions.

(4) In the foregoing preferred embodiments, after it has been determined as NO in step S402, the process returns again to step S402 and step S402 is repeated until it is determined that the steel instrument 20 has been placed on the reading apparatus 10. However, this is merely an illustrative example. For example, it is possible that a warning may be issued to the user after step S402 has been repeated a predetermined number of times.

(5) In the foregoing preferred embodiments, if it is determined that the luminance is at the minimum luminance value at step S430, the process immediately moves to step S432 and the reading is terminated. However, this is merely an illustrative example. For example, it is also possible that the process may return to step S406, and proceed to step S432 after steps S406 to S430 have been repeated two or more times.

(6) In the foregoing preferred embodiments, the luminance of the blue light emitted from the LEDs 18 is lowered step by step in step S434, but this is merely illustrative. For example, the luminance of the blue light emitted from the LEDs 18 may be increased step by step. In this case, the luminance of the blue light is adjusted to a predetermined minimum luminance value in step S406. In addition, in step S430, it is determined whether or not the luminance of the blue light is at the maximum luminance value.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An optical symbol reading apparatus comprising:
an illuminator illuminating with blue light an optical symbol marked on an object;
an imager taking an image of the optical symbol that has been illuminated with the blue light;
a controller connected to the illuminator and the imager; and
a support table to place the object thereon; wherein
the controller includes a receiving circuit receiving the image taken by the imager, a determination circuit determining whether the received image has a resolution equal to or higher than a predetermined reading resolution, an image acquisition circuit acquiring the image as image data if the determination circuit determines that the received image has a resolution equal to or higher than the reading resolution, and a light adjusting circuit changing an illumination condition of the blue light if the determination circuit determines that the received image has a resolution less than the reading resolution;
the support table includes an opening;
the illuminator is disposed below the support table including the opening and above the imager;
the illuminator includes a blue light illumination section;
the imager includes a lens; and
a center of the opening of the support table, a center of the blue light illumination section of the illuminator, and a center of the lens of the imager are coaxial with each other.

2. The reading apparatus according to claim 1, wherein the light adjusting circuit changes a luminance of the blue light if the determination circuit determines that the received image has a resolution less than the reading resolution.

3. The reading apparatus according to claim 2, wherein the light adjusting circuit lowers the luminance of the blue light if the determination circuit determines that the received image has a resolution less than the reading resolution.

4. The reading apparatus according to claim 2, wherein the light adjusting circuit increases the luminance of the blue light if the determination circuit determines that the received image has a resolution less than the reading resolution.

5. The reading apparatus according to claim 1, wherein the light adjusting circuit changes an illumination pattern of the illuminator if the determination circuit determines that the received image has a resolution less than the reading resolution.

6. The reading apparatus according to claim 1, wherein the illuminator includes two or more light sources arranged at different positions from each other relative to the optical symbol.

7. The reading apparatus according to claim 1, wherein the blue light illumination section includes an annular shape and surrounds the optical symbol.

8. The reading apparatus according to claim 7, wherein:
the blue light illumination section is divided into a plurality regions; and an illumination pattern of the illuminator includes a combination of lit and unlit states of the plurality of regions.

9. The reading apparatus according to claim 1, wherein the controller repeats two or more times the changing of the illumination condition of the blue light and the determining of whether or not the received image has a resolution equal to or higher than the reading resolution, if the determination circuit determines that the received image has a resolution less than the reading resolution.

10. The reading apparatus according to claim 1, further comprising a sensor detecting whether or not the object is placed thereon.

11. A method of reading an optical symbol, comprising:
a first step of illuminating an optical symbol marked on an object, which has been placed on a support table, with blue light by an illuminator and taking an image of the optical symbol by an imager;
a second step of determining whether or not the image taken in the first step has a resolution equal to or higher than a predetermined reading resolution; and
a third step of acquiring the image as image data if it is determined in the second step that the taken image has a resolution equal to or higher than the reading resolution, and changing an illumination condition of the blue light if it is determined in the second step that the taken image has a resolution less than the reading resolution; wherein
the support table includes an opening;
the illuminator is disposed below the support table including the opening and above the imager;
the illuminator includes a blue light illumination section;
the imager includes a lens; and
a center of the opening of the support table, a center of the blue light illumination section of the illuminator, and a center of the lens of the imager are coaxial with each other.

12. The method according to claim 11, wherein the first step, the second step, and the third step are repeated two or more times.

* * * * *